United States Patent [19]

Loxley et al.

[11] 3,972,704
[45] Aug. 3, 1976

[54] APPARATUS FOR MAKING VITREOUS SILICA RECEPTACLES

[75] Inventors: Ted A. Loxley, Mentor; Walter G. Barber, North Perry; Walter W. Combs, Mentor; John M. Webb, Chagrin Falls, all of Ohio

[73] Assignee: Sherwood Refractories, Inc., East Cleveland, Ohio

[22] Filed: Aug. 5, 1974

[21] Appl. No.: 495,129

Related U.S. Application Data

[63] Continuation-in-part of Ser. No. 363,622, May 24, 1973, Pat. No. 3,837,825, which is a continuation-in-part of Ser. No. 135,140, April 19, 1971, abandoned.

[52] U.S. Cl. .................................. 65/157; 65/162; 65/355; 65/DIG. 4; 65/DIG. 13; 165/18; 425/144; 432/77; 266/253
[51] Int. Cl.² ........................................ C03B 29/00
[58] Field of Search ............... 65/157, 18, 160, 162, 65/DIG. 13, 161, 355, 152, DIG. 4; 425/144; 266/5 A; 432/77; 165/18

[56] References Cited
UNITED STATES PATENTS

| | | |
|---|---|---|
| 1,617,056 | 2/1927 | Kenworthy .......................... 266/5 A |
| 1,876,960 | 9/1932 | Kenworthy .......................... 266/5 A |
| 2,577,611 | 12/1951 | Eves ................................. 65/161 X |
| 2,695,475 | 11/1954 | Ellis ................................. 65/160 X |
| 2,917,871 | 12/1959 | Atkeson .............................. 65/161 |
| 3,619,440 | 11/1971 | Gray ................................. 65/18 X |

*Primary Examiner*—S. Leon Bashore
*Assistant Examiner*—Frank W. Miga

[57] ABSTRACT

Apparatus is disclosed for automated mass production of precision transparent silica glass products in accordance with a unique process in which slip-cast fused silica articles are rapidly heated and sintered in a vacuum or in a helium or hydrogen atmosphere at high temperatures, such as 2950° to 3150°F. A heated graphite susceptor shaped to conform to the outer surface of the fused silica article is automatically moved between a cooling zone and an induction furnace chamber which is opened momentarily to admit the article. The furnace and the graphite susceptor are designed to cause the trapped gases in the article to move radially outwardly and to effect rapid heating so as to avoid substantial devitrification during sintering.

8 Claims, 5 Drawing Figures

APPARATUS FOR MAKING VITREOUS SILICA RECEPTACLES

This application is a continuation-in-part of copending application Ser. No. 363,622, filed May 24, 1973, now U.S. Pat. No. 3,837,825, which is a continuation-in-part of earlier application Ser. No. 135,140, filed Apr. 19, 1971, now abandoned. This application is directed to subject matter disclosed in the aforesaid applications which is incorporated herein by reference.

The present invention relates to an apparatus for making transparent amorphous silica glass from particles of fused silica and more particularly to the manufacture of sintered fused silica crucibles and other transparent precision silica glass products having high resistance to thermal shock. The invention makes it possible to mass produce precision transparent amorphous quartz glass articles at low cost without expensive glass working procedures.

Heretofore, fused silica has been fabricated by glass working, slip casting or pressing techniques. Glass working methods involve heating the glass to a temperature, such as 3500°F. or higher, to lower the viscosity to a point where the glass may be subjected to plastic deformation, as by rolling, pressing or drawing. Such glass working methods have been used extensively for many years in spite of high cost and the need for specialized equipment and skilled technicians for the production of any but the most simple shapes.

Slip casting has also been used extensively for many years because it is the least expensive of all fabrication methods, does not require expensive equipment, and is able to handle complex shapes, but the normal slip casting methods used prior to the present invention were unsatisfactory for making precision high quality fused quartz products such as transparent quartz glass crucibles.

Hot pressing was not used extensively in the commercial fabrication of fused silica products because of the inability to handle complex shapes and the requirement of specialized equipment.

For many years prior to the present invention, it was thought that glass working was the most practical method for producing precision transparent amorphous quartz glass products, excluding those fairly simple shapes which can be cast without a mold in a resistance or arc-furnace. For this reason, transparent quartz glass products have been expensive. For many years, those in the glass industry thought that less expensive methods, such as slip casting, could not produce transparent quartz glass products with a quality comparable to that of products made by glass working.

While this problem existed a long time prior to the present invention, a fully satisfactory solution was not found. The problem was a difficult one because of the nature of fused quartz and the need to avoid devitrification and the formation of substantial amounts of cristobalite. The latter undergoes the alpha-beta inversion at a temperature between 340° and 510°F. and, when present in relatively small amounts, causes the fused quartz to crack when it reaches the inversion temperature during heating or cooling. Because the rate of formation of cristobalite increased rapidly when fused silica is heated above 2200°F.\*, it was thought prior to this invention that the firing temperatures for slip-cast products should ordinarily be not higher than 2200°F. This was considered important, particularly because the large exposed surface area of fused silica particles in the slip-cast product which resulted in a higher devitrification rate.

\*The rate of formation of cristobalite at 2400°F. is probably at least 10 times the rate of formation at 2200°F.

Where a precision high-density fused silica product of high strength was required, as in the case of crucibles used to hold molten silicon, it was thought, prior to this invention, that expensive glass working was the most practical way to meet the desired specification.

In the case of the quartz crucibles, which was used to hold molten silicon during the growing of a silicon crystal rod, the product was considered unsatisfactory if it contained significant amounts of cristobalite or was misshapen. Such silicon crystal rods, which are cut to form wafers for use in micro-electronic circuits, are made by melting the silicon metal in the quartz glass crucible by heating for about one-half hour to a drawing temperature of about 2585°F., introducing a seed crystal, and pulling the crystal for a period of about 8 to 16 hours at such temperature.

Attempts have been made to make a less expensive vitreous silica crucible as a substitute for crucibles made by glass working but the results have not been completely satisfactory and do not approach the results obtained by the present invention. For example, one manufacturer obtained a number of patents on processes wherein a porous amorphous silica crucibles of very low density are produced by vapor phase hydrolysis of silicon tetrachloride and the high-purity porous articles are sintered and caused to shrink onto a mandrel. The crucibles produced in this manner are so expensive that this general type of process has never been commercially practical. For example, crucible made by the process of U.S. Pat. No. 3,619,440 cost several times as much as those made according to the present invention and are unacceptable because of such cost.

A process less expensive than that of U.S. Pat. No. 3,619,440 is disclosed in U.S. Pat. No. 3,620,702, which involves torching local areas of a slip-cast crucible as it is rotated, but such torching process does not maintain close tolerances and is incapable of producing transparent crucibles with a quality approaching that of a glass-worked crucible. Subsequent to the present invention, the owner of said U.S. Pat. No. 3,620,702 learned how to make low-cost opaque or transparent crucibles of high quality without rotational torching. This is disclosed in U.S. Pat. No. 3,763,294.

Applicants have discovered a simple unique process which will produce from powdered fused quartz a precision transparent amorphous quartz crucible of high density having the required strength, crack resistance, and resistance to devitrification and will avoid formation of significant amounts of cristobalite. The cost of manufacture of such transparent amorphous quartz crucibles is less than half that of the crucibles formed by glass working. Applicant's process facilitates economical mass production, from the powdered fused quartz, of precision transparent glass crucibles having a quality comparable to that obtainable by glass working and having excellent resistance to thermal shock. For example, such crucibles having a temperature of 2700°F. can be cooled without cracking by placing them in water at room temperature.

Applicants have discovered that high density fused quartz crucibles and other precision fused silica products of high quality can be made in a simple inexpensive manner from particles of essentially pure fused quartz or fused silica which are molded or formed by powder metallurgy techniques, such as slip casting or pressing. A slip-cast crucible, for example, which has been dried and fired at a high temperature, such as 2100°F., is heated rapidly to a high temperature such as 2950°F. or above (e.g., in the range of 3000° to 3100°F.), and maintained at a temperature in that range in a furnace for a short period of time, such as 1 to 5 minutes, to sinter the fused silica and to increase the density to 99 percent or greater and preferably full density while avoiding significant devitrification and maintaining the desired shape. Such heating may, for example, be carried out in a graphite-lined furnace containing hydrogen gas or an inert gas, such as helium, nitrogen or argon. Where the fused quartz article must be transparent it is possible to carry out the sintering in a vacuum or in a hydrogen atmosphere, but the preferred method employs an atmosphere of helium. When using helium, the equipment required is very simple and a mass production process can be carried out at atmospheric pressure. The slip casting can also be carried out at atmospheric pressure with the simplest equipment.

It has been discovered that, in order to obtain a transparent amorphous quartz glass product with a very high quality approaching that of a glass-working article, the slip-cast article should have a high purity and should be vacuum dried to remove essentially all of the water. The finished product should have an infrared absorption beta OH factor below 0.04 and preferably below 0.01 at a wavelength of approximately 3.5 microns, as measured on an infrared spectrophotometer. This may be achieved by firing or sintering the slip-cast or pressed crucible in a vacuum furnace at a suitable temperature, such as 2000° to 2200°F., before the dried crucible is placed in the induction furnace.

The apparatus of the present invention used in the manufacture of precision crucibles preferably employs a shaped support or a mandrel which is formed of a refractory material, such as graphite, and which has a shape to conform to the surface of the crucible. Such support can be at all times maintained at a high temperature, such as 2500°F. or above, and is mounted to move quickly from an exposed loading position to a heating position within the furnace, wherein the crucible is heated to the desired sintering temperature.

In the preferred embodiment of the invention, the shaped support is a convex graphite susceptor and is mounted on a carriage within a separate cooling unit having refractory enclosing walls which move in unison with the carriage. Such cooling unit can be moved from a first loading position, at one side of the furnace, to a second position in alignment with the furnace chamber in which the graphite susceptor may be advanced into the furnace. The furnace is designed to heat the exterior surface of the crucible to a temperature above the interior surface so that trapped gas flows radially outwardly.

An object of the invention is to reduce the cost of manufacture of precision crucibles for the drawing of silicon crystal rods.

Another object of the invention is to provide apparatus for avoiding substantial devitrification in the manufacture of sintered fused quartz crucibles.

A further object of the invention is to mass produce precision transparent amorphous quartz crucibles and other articles of extreme high quality at minimum cost.

Another object of the invention is to provide a simple mass production apparatus for increasing the density of a fused silica product and converting it from an opaque or translucent state to a transparent amorphous state while avoiding formation of significant amounts of cristobalite and maintaining the desired size and shape.

Another object is to provide simple, economical equipment for mass producing precision transparent quartz glass products at atmospheric pressure.

These and other objects, uses and advantages of the invention will become apparent to those skilled in the art from the following description and claims.

Figure 1:
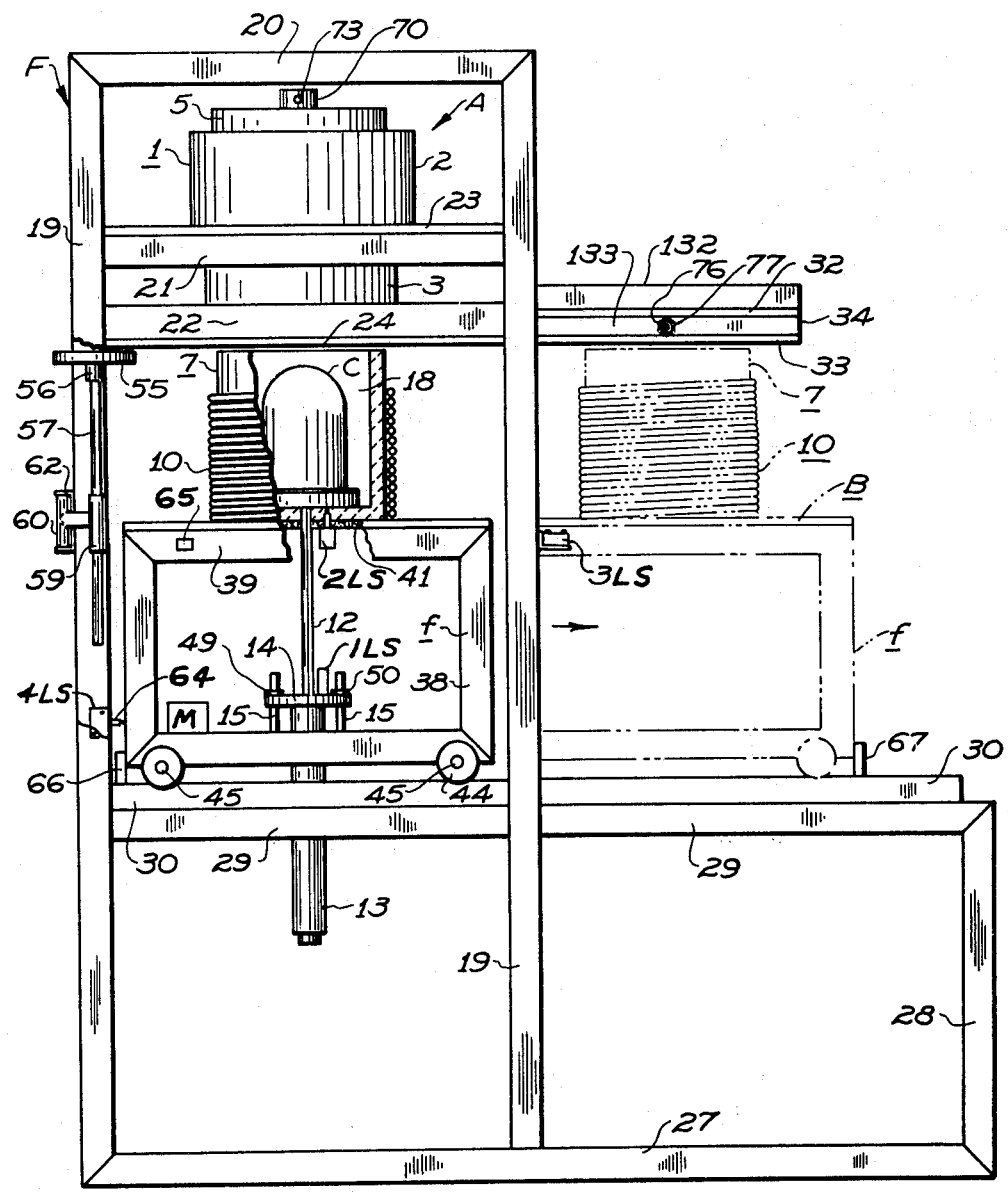
FIG. 1 is a side elevational view of the apparatus of this invention on a reduced scale with parts omitted and parts broken away and shown in section, the moved position of the movable cooling unit being shown in dot-dash lines.

The particles fused silica used in the practice of the present invention should be essentially pure or have a purity of 99.95 percent or higher and preferably has a purity of at least 99.99 percent. The fused silica is considered "essentially pure" if it will contain no more than 0.05 percent of impurities when heated to a sintering temperature, such as 2200°F. or higher. A somewhat lower purity might be tolerated if the impurity is a compound, such as silicon carbide, silicon nitride, zirconium oxide or aluminum oxide. Significant amounts of fluxing impurities should be avoided. The fused silica may contain a small percentage (e.g., less than 1 percent) of an organic material, such as polyurethane rubber, which burns off without leaving a substantial residue. Satisfactory results can, therefore, be obtained by grinding fused silica sand in a ball mill even if the resulting fused silica powder contains small amounts of rubber or other organic polymer.

The fused silica used in the practice of this invention is preferably a fused quartz of high purity obtained from quartz sand or rock crystal and may, for example, be obtained in the desired particle size by pulverizing or grinding essentially pure fused quartz sand or rock crystal having a purity of 99.95 to 99.99 percent or higher. The fused quartz should be substantially free of foreign matter as should be cleaned so that, after grinding, the fused quartz has the necessary purity. Excellent results can also be obtained from synthetically produced fused silica having the necessary purity. In general, the results improve as the purity of the fused quartz increases. It is, therefore, preferable to maintain a purity of at least 99.97 percent.

The fused quartz may be pulverized in various ways without introducing significant amounts of impurities. This is preferably accomplished in a ball mill, but the fused quartz may also be pulverized by crushing or by explosion or impact of particles on each other at high velocity. Pulverization could be accomplished using a vibro-energy mill, a Katy mill, a rod mill or an ultrasonic mill, for example.

Excellent results can be obtained by grinding fused quartz (e.g., fused quartz sand) in a conventional ball mill having balls or stones formed of essentially pure quartz glass or fused silica and having a low ash rubber lining, such as a polyurethane rubber or other suitable organic lining. The liquid employed during grinding is preferably distilled water so that a slurry is produced suitable for conventional slip casting. However, the vehicle used for the slurry may be a liquid other than water, particularly a liquid which will evaporate without leaving a significant residue. A polar liquid, such as kerosene, for example, could be used, but best results are obtained when the vehicle is water.

The fused silica particles used in the practice of this invention should have a particle size no greater than 200 microns and preferably have a particle size not in excess of 100 microns. When slip casting is employed, the average particle size is between 1 and 70 microns and is preferably 2 to 10 microns. The size of the fused silica particles should be suitable for slip casting as is well understood in the art. When making transparent amorphous quartz glass by the process of this invention, it is usually preferable to employ fused silica particles with an average particle size of 1 to 10 microns.

The materials used in the practice of this invention to form the crucible or other article consist essentially of fused silica particles and, where slip casting is employed, a suitable vehicle, such as distilled water. It is preferred not to employ additives or a binder to assist in holding the particles together, particularly when making a substantially transparent quartz glass.

The desired article may be formed from the pulverized fused quartz particles by a hot- or cold-pressing operation or the like but is preferably formed by a conventional slip casting procedure using a porous mold with an interior surface shaped to conform to the exterior surface of the crucible or other desired article. The article is preferably slip cast at atmospheric pressure without application of additional pressure. The material used to form the porous mold may be plaster of Paris or other suitable mold material. If the mold material is one which can contaminate the fused quartz, the mold should be coated or lined with a protective layer of graphite or other suitable material. If the mold is made of silica or other non-contaminating material as hereinafter described, such coating is not needed.

A mold release consisting essentially of graphite can be used to serve as a lubricant or parting agent and, if a plaster mold is used, to protect the fused silica from the plaster. The graphite may be brushed onto the mold surface to provide a thin protective coating, for example, with a thickness of a few microns. Such graphite should be substantially free of impurities or undesirable foreign matter and is preferably essentially pure.

After the porous mold has been suitably coated, for example with the graphite powder, the slurry containing pulverized fused silica suspended in distilled water is poured into the mold. The porous mold draws the water out of the slurry so that after a suitable period of time, such as 10 to 20 minutes or so, the desired wall thickness will be obtained. The time may be reduced somewhat by applying pressure to the slip, but it is preferable not to apply such pressure. At the end of such period, the mold is turned upside down to remove the excess slurry, returned to its upright position, and thereafter allowed to dry. The resulting slip-cast crucible will shrink slightly so that it can easily be removed from the mold. Such removal can be facilitated by directing air from a nozzle into the space between the crucible and the mold to blow off the crucible. At this stage the crucible has sufficient strength to support itself and can be dried in the conventional manner with or without internal support from a mandrel or the like.

After removal from the mold, the crucible or other casting should be dried thoroughly before firing to avoid damage from too rapid moisture evolution. Drying can be effected in various ways. One simple and convenient method is to dry the casting overnight at 110° to 120°F. and thereafter dry it for several more hours at a temperature of 300° to 400°F.

If a mold release other than graphite is used, it may be necessary to clean the casting before firing. If any excess graphite is present on the casting, it can be removed before firing, but this may not be important as oxidation of the graphite during firing is usually effective and apparently does not have a substantial effect on devitrification.

The casting is preferably fired in air or steam or in an inert atmosphere prior to the final sintering or glassifying operation to eliminate combustibles, such as rubber particles from the ball mill lining. Such optional firing also removes absorbed water which is not removed during the previous drying.

In a typical process, the casting may be thoroughly dried at a temperature of 100° to 400°F. and then fired at a temperature of 2000° to 2200°F. for a suitable period of time, such as 20 to 60 minutes or more, sufficient period of time, such as 20 to 60 minutes or more, sufficient to eliminate the combustibles and to effect adequate sintering to strengthen the casting for easy handling. The casting would be maintained in a dry place until the final sintering treatment at a higher temperature (e.g., above 3000°F.).

In the optional firing described above, the temperature is preferably not in excess of 2200°F. so that cristobalite formation is minimized. Because it is not necessary to obtain a high strength during this firing, the sintering time for most castings can be limited to 1 or 2 hours to minimize cost and avoid unnecessary devitrification.

It has been discovered that normal firing of the slip-cast crucible at atmospheric pressure does not provide the final amorphous glass product with the best quality and that vacuum drying is essential to assure top quality. The vacuum drying can be effected in various ways with varying degrees of vacuum (for example, at pressures of 1 to 100 torrs) and is preferably carried out at a pressure not in excess of 20 torrs and a temperature not in excess of 2200°F. The heating time may be limited as indicated above and is selected to provide the desired degree of dryness.

One preferred procedure is to fire or sinter the slip-cast or pressed crucible or other fused silica article in a vacuum furnace at a pressure of 0.5 to 10 torrs and at a high temperature, such as 2000° to 2200°F., so that essentially all of the water is removed including the water of hydration on the silica particles. The amount of vacuum applied should be such that the amorphous quartz glass of the finished crucible or other article has an infrared absorption beta OH factor, as measured on an infrared spectrophotometer, that is below 0.04, preferably below 0.02 and more preferably below 0.01 at a wavelength of approximately 3.5 microns (for example, from about 0.001 to about 0.006). The vacuum drying as described above makes it possible to produce a transparent glass with high viscosity and high resistance to devitrification approaching that of quartz glass produced by glass working.

After firing at 2100° to 2200°F., the crucibles are usually cooled to room temperature. Because the fused silica casting has good thermal shock resistance, it may be heated very rapidly to the firing temperature by placing it in a preheated furnace or on a preheated graphite mandrel similar to the mandrel 16 shown herein. It may also be cooled rapidly in air after firing.

The dried slip-cast crucible or other casting produced in the manner described above is thereafter placed in a furnace and subjected to a final heating to effect vitrification at a high temperature, such as in the range of 3000° to 3150°F. without changing the shape of the article. This heating should be carried out in such a way as to avoid blistering or substantial devitrification and, therefore, the casting should be heated rapidly to a sintering temperature in the proper range (e.g., 3000° to 3150°F.) and held at that temperature for a limited period of time, such as 1 to 5 minutes, to obtain the desired precision fused quartz product. The casting cannot be allowed to remain at a temperature above 2200°F. for too long a period of time because of devitrification.

The crucibles made according to the present invention, which are vacuum dried as described above, contain an amount of water which is a small fraction of that contained in crucibles made prior to this invention.

In the practice of this invention, the slip-cast fused silica crucible or other casting is heated rapidly, by placing it on a hot mandrel or support, which has a temperature of 2500° to 3000°F. and preferably 2600° to 2700°F., and quickly moving the casting on the support into a furnace having a temperature preferably above 3000°F. (e.g., 3000° to 3200°F.). The temperature of the crucible or other casting is rapidly raised from below 2200° to 3000°F. or higher in 2 minutes or less and preferably in 1 minute or less and is preferably held in the range of 3000° to 3150°F. for a sintering period of 1 to 6 minutes to provide a density of at least 99 percent and preferably to provide a transparent or substantially transparent quartz glass. The heating is carried out in a manner to maintain the desired size and shape and to provide a precision product. When making precision crucibles, said sintering period is preferably no more than 5 minutes and more preferably about 2 to 4 minutes.

The crucible is cooled after the glass reaches the desired maximum temperature, which is frequently 3050° to 3100°F. and preferably no more than 3150°F. When making relatively thick quartz glass articles, the sintering time may be somewhat greater than the maximum glass temperature of the surface may be as high as 3200°F. before the article is cooled. The glass temperature provided by the furnace treatment should be adjusted in accordance with the wall thickness and/or total weight of the article being sintering so that a higher temperature or longer heating time may be better for an article of greater wall thickness.

The quartz glass crucible is preferably removed from the furnace and cooled for a short period of time (i.e., 1 minute or less) on the graphite mandrel or form to an intermediate temperature, such as 2500° to 2700°F. before the crucible is removed from the mandrel and cooled to room temperature. The crucible should be cooled to a temperature below 2200°F. within 2 or 3 minutes after it is removed from the furnace and before there is significant devitrification.

In order to minimize formation of cristobalite, the crucible is heated to increase the temperature from 2200°F. or below to the desired maximum glass temperature in no more than 8 minutes and is then cooled to a temperature below 2200°F. so that the fused quartz is subjected to a temperature above 2200°F. during such heating and cooling for a period of no more than about 10 minutes.

Highest quality fused silica products are produced by the process of this invention when the final sintering operation is carried out in a helium atmosphere or in a vacuum. Operation at atmospheric pressure with helium is preferred and makes possible mass production of precision transparent quartz glass articles at a fraction of the usual cost using relatively inexpensive equipment, for example, as described below. The process is also very reliable so that waste due to scrapping of defective pieces is minimized. The quality of the transparent product which can be consistently produced by mass production is admirable. The product has exceptionally good thermal shock resistance as can be readily demonstrated. For example, typical mass produced transparent quartz glass crucibles made by the process of this invention and having a temperature of 2000°F. will not crack when placed in water at room temperature (i.e., 70°F.) to effect immediate cooling. If desired, such drastic cooling may be employed to test the quality of the glass and to demonstrate the absence of significant amounts of cristobalite.

The process and apparatus of this invention are very versatile and highly advantageous for this reason. For example, the furnace temperature can be 2950° or 3200°F. and the heating time can be a few minutes or as much as 10 minutes. The maximum glass temperature can be substantially less than the furnace temperature if the heating time is short. The invention makes it practical to mass produce transparent crucibles when heating to a temperature which may, for example, be 3000° to 3100°F. or substantially less than the melting point of cristobalite. The process as disclosed in U.S. Pat. No. 3,763,294 requires heating of the silica glass above the melting point of cristobalite to change the glass from the translucent to the transparent state.

In some applications it is highly advantageous to retain whatever cristobalite is present and to avoid heating above the melting point or above 3200°F. A lower sintering temperature is also desirable since it avoids undesirable changes in shape or wall thickness due to glass flow. The present invention is advantageous in that a slip-cast crucible can be sintered at atmospheric pressure in a hydrogen or helium atmosphere to full density and to a transparent state without heating the glass above the melting point of cristobalite and without causing undesirable glass flow.

The process of this invention also contemplates high furnace temperatures, such as 3200°F., which will melt the cristobalite and/or cause some shrinkage of the glass on the mandrel, but the high temperatures are not essential for crucibles of normal size.

Figure 2:
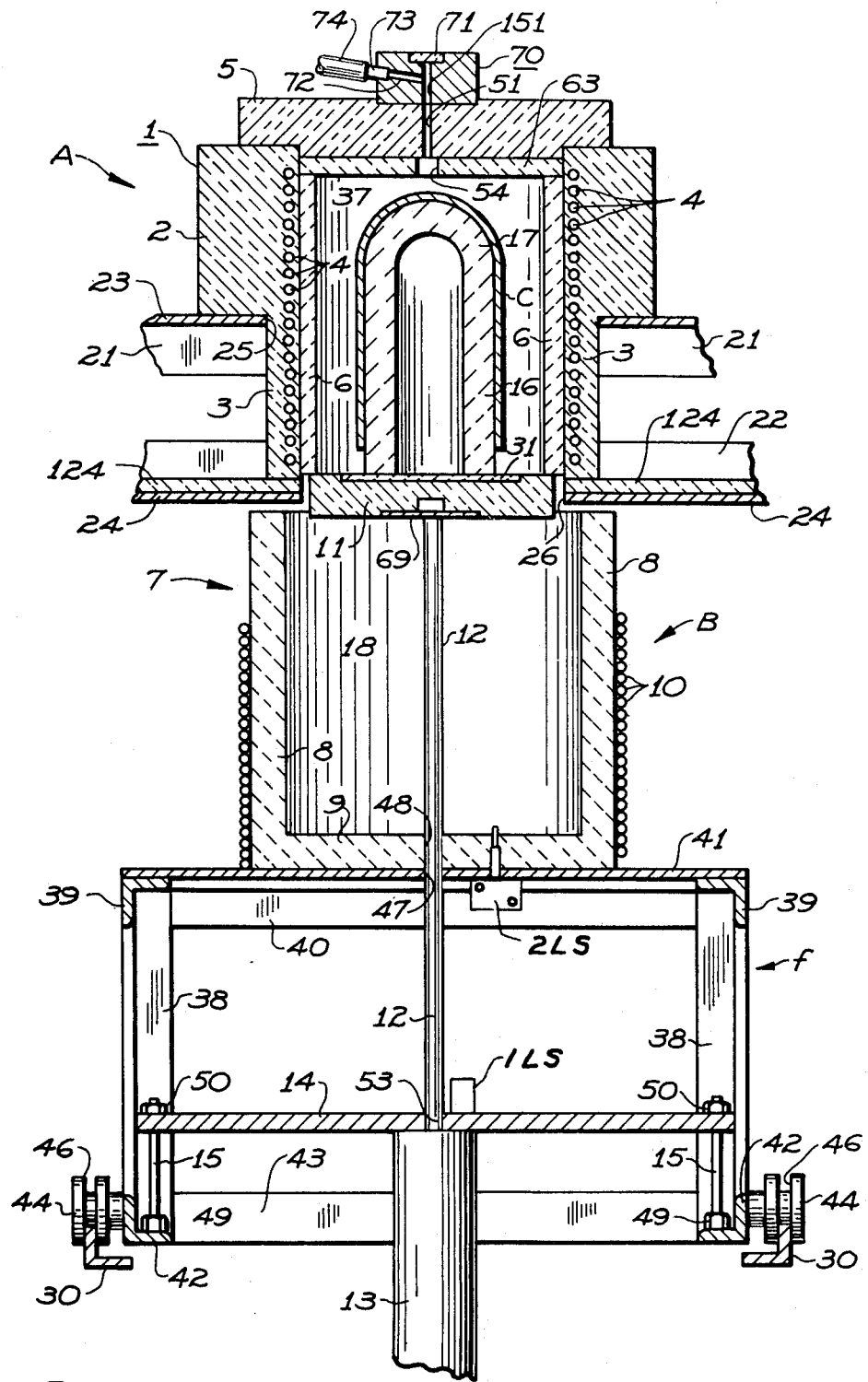
FIG. 2 is a transverse vertical sectional view of the apparatus of FIG. 1 on a larger scale, the graphite susceptor and crucible being shown in the uppermost position.
Figure 4:
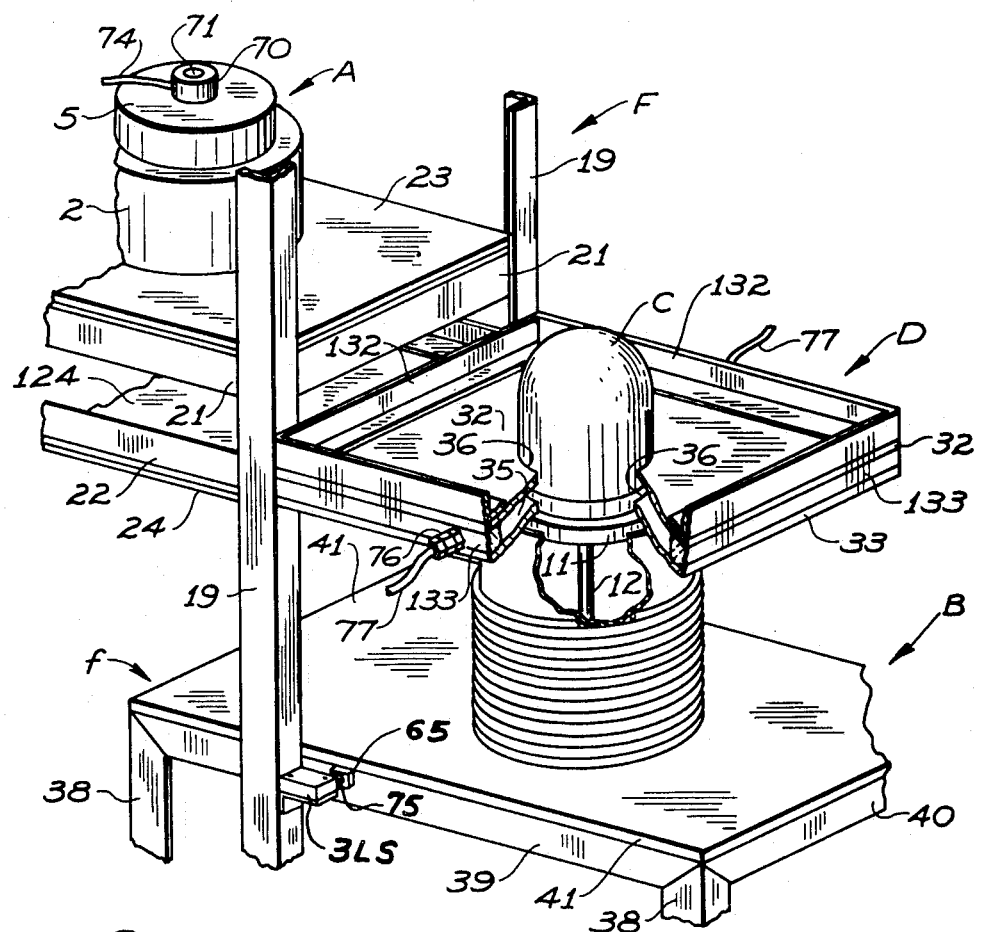
FIG. 4 is a fragmentary perspective view with parts broken away and parts omitted showing the position of the parts just before removal of the finished crucible.

Referring more particularly to the drawings, which are drawn substantially to scale and in which like parts are identified by the same numerals throughout the several views, FIGS. 1 and 2 show a special induction furnace constructed to perform the process of the present invention and having a stationary upper furnace unit A, a lower movable cooling unit B, and a rigid metal frame F for supporting the units A and B and for providing a guide means for supporting the movable cooling unit and allowing it to be moved from the normal position shown in solid lines in FIGS. 1 and 2 to the unloading position shown in FIG. 4 and in dot-dash lines in FIG. 1.

The induction furnace unit A has an annular refractory body 1 which comprises a relatively thick upper cylindrical portion 2, a cylindrical portion 3 of reduced thickness, and a helical copper heating coil 4 embedded in the refractory material of the body 1 coaxial with the internal cylindrical surface of said body 1. The top of the furnace unit A is covered by a flat circular refractory cap 5 which fits the body 1 in sealing engagement throughout its periphery. A flat circular refractory plate 63 of uniform thickness engages the flat bottom surface of the cap 5. A cylindrical refractory sleeve 6 of uniform thickness fits inside the body, as shown in FIG. 2, and extends from the margin of the plate 63 to a point near the bottom of the body 1. A flat plate 24 is provided under the body 1 and has a circular opening 26 with a diameter equal to the internal diameter of said body. A refractory plate 124 covers the plate 24 and engages the bottom of the body 1.

A cylindrical refractory heat sink or cup 7 of uniform wall thickness forms the cooling chamber 18 of the movable unit B and is positioned coaxial with the sleeve 6 and the furnace body 1 as shown in FIGS. 1 and 2. The flat annular upper surface of the cylindrical wall 8 of said cup is located adjacent to or closely spaced from the flat bottom surface of the plate 24 to retain gases in the chamber 18 with limited air flow through the small clearance space between the upper furnace unit A and the lower cooling unit B. Such clearance space is provided between the cup 7 and the plate 24 to permit easy movement of the unit B in a horizontal direction, but it will be understood that the vertical width of such space may be relatively small (for example, 0.03 to 0.1 inch).

The cylindrical refractory wall portion 8 is preferably integral with the flat circular base portion 9 and is surrounded by a helical copper cooling coil 10, which is coaxial with the cup. If desired, such coil can be embedded in the cup like the coil 4 described above. The water or other cooling fluid is constantly circulated through the coil 10 to maintain the walls 8 at a moderate temperature, such as 300° to 400°F., and to effect cooling of the mandrel 16 at the desired rate. The base portion 9 has a central cylindrical hole 48 for receiving the piston rod 12, which remains coaxial with the wall 8 during reciprocation of the circular refractory support plate 11. The unit B shown herein has a double-reacting pneumatic cylinder 13 with a piston which reciprocates the support plate 11 between a normal retracted position in engagement with the base 9, as shon in FIG. 7, and an uppermost position adjacent to the bottom marginal surface of the sleeve 6, as shown in FIG. 2. The cylinder 13 may be rigidly mounted on the frame f of the unit B by means of a horizontal mounting plate 14 and bolts 15 as described in more detail hereinafter.

The support plate 11 shown herein is recessed to receive a circular plate 31 of uniform thickness having a flat upper surface perpendicular to the piston rod 12. The lower surface of the support plate may be recessed in a similar manner to receive a flat circular metal plate 69 which is rigidly and detachably connected to the piston rod.

As herein above, the refractory support plate 11 has a diameter slightly greater than the internal diameter of the sleeve 6 and less than the internal diameter of the circular hole in plates 24 and 124 so that the furnace chamber 37 is substantially closed when the plate 11 is in its upper position. However, a clearance space or other opening may be provided to allow some of the furnace gases to move downwardly through or passed the plate 11. A continuous flow of helium may be provided through the furnace to flush out any air or other gas that may leak into the furnace during the cycle.

A shaped support or susceptor 16 of circular or other suitable cross section is rigidly mounted on the flat upper surface of the refractory plate 31 in a position coaxial with the piston rod 12 so as to be located coaxial with the refractory sleeve 6 when a crucible C is placed in the furnace chamber 37 of the furnace unit A. The susceptor is preferably convex and has an exterior surface which is preferably smooth and which has a shape corresponding to the shape of the crucible. As herein shown, the susceptor comprises a mandrel having a hollow hemispherical upper portion 17, but it will be understood that the shape can vary substantially.

The susceptor 16 can have relatively thin walls or relatively thick walls and can be perforated or slotted, if desired, to facilitate removal of gas from the inside surface of the crucibles as it is being sintered. Thicker walls provide more strength, tend to hold the heat and can effect faster heating of the green crucible at the beginning of the cycle. The thick walls can be perforated or can be provided with axial slots at the outer surface extending from the top to the bottom of the susceptor.

The material used to form the furnace body 1, the cover 5, the cup 7 and the circular support plate 11 is preferably a ceramic or refractory material which is not damaged by high temperatures. Such material may be a conventional ceramic material used for metal casting and containing zirconium silicate, aluminum silicate, fused silica and/or refractory oxides, such as oxides of aluminum, zirconium, magnesium beryllium or titanium. The inner surface of the furnace, the outer surface of the mandrel 16, and preferably also the inner surface of the cup 7 are formed of a refractory material, such as graphite or platinum, which is capable of withstanding temperatures of 3000° to 3400°F. or higher, and which does not cause a damaging reaction with the fused quartz of the crucible. In the apparatus shown herein, the mandrel 16, the entire cup 7 of the cooling unit B, and the sleeve 6 and plates 31, 63 and 124 of the furnace A are formed of graphite. The latter material is usually preferred because of cost considerations but other materials can be used. Also the surface of the graphite may be covered with another material, such as platinum. The entire mandrel 16 can be made of platinum and provided with a smooth outer surface for engaging the glass crucible, but it is usually preferable to employ a less expensive refractory, such as graphite.

When induction heating is employed, the sleeve 6 should contain a material having magnetic susceptibility which can be heated by the induction coils of the furnace. The term "susceptor" is used herein to indicate such susceptibility. In the apparatus shown in the drawings, the convex form or mandrel 16, the plate 63, and the sleeve 6 are susceptors and function to heat the quartz crucible to the desired sintering temperature. The sleeve 6 and the plate 63 may be heated to a temperature of 3000° to 3200°F. or somewhat higher. The mandrel is heated to a lower temperature, such as 2950° to 3150°F. or higher, during the sintering operation and is then cooled to a lower temperature, such as 2500° to 2700°F. to facilitate handling of the crucible. After such cooling, the mandrel can be reheated before loading the next slip-cast crucible to a high temperature, such as 3000°F., so that the crucible is heated as quickly as possible; but it is usually preferable to omit the extra heating step and to mount the next crucible on the mandrel when the mandrel is still at the lower temperature, such as 2700°F.

It is preferable to provide a refractory cover plate or the like for covering the bottom end of the furnace body 1 when the unit B is moved away from the unit A a distance sufficient to expose the interior of the furnace. This can be a simple horizontal extension at the top of cup 7. As herein shown, a flat circular cover plate 55 is provided for this purpose and is mounted to swing about pivot pins 61 into and out of a closing position. The refractory material used to form the cover plate 55 may be graphite and/or may be the same ceramic material used to form the furnace body 1.

As herein shown, the apparatus of this invention has a rigid metal frame F which includes a number of metal angles bolted, welded or otherwise rigidly connected together. The frame includes four vertical legs 19 that are interconnected at their upper ends by four horizontal angles 20 forming a rectangular horizontal framework. The legs 19 are rigidly connected to an intermediate rectangular framework comprising four horizontal metal angles 21, which support a rectangular flat plate or insulating board 23 in a horizontal position. Such board may be formed of a heat resistant material, such as asbestos or a pressed asbestos-like material, such as transite board, and may have a thickness of one-fourth to one-half inch. A similar insulating board 124 is supported in a horizontal position parallel to the board 23 by four metal angles 22. Circular holes 25 and 26 are provided at the centers of the insulating boards 23 and 124, respectively, as shown in FIG. 2 so that the furnace body 1 may be mounted with its axis in a vertical position and supported by the two insulating boards. A graphite plate 24 of the same shape as the board 124 and having a thickness of one-fourth and one-half inch may be mounted below said board. The frame F also includes a pair of horizontal longitudinal angles 27, which are rigidly connected to the bottom portion of the legs 19, and a pair of horizontal longitudinal angles 29 parallel to the angles 27. Short vertical angles 28 are rigidly connected between angles 29 and for a pair of straight longitudinal rails 30, which are rigidly mounted on the angles 29. The rails engage the wheels 44 of the cooling unit B and provide means for guiding the unit horizontally from a normal operating position below the furnace unit A, as shown in solid lines in FIG. 1, to an unloading position below the insulating unit D, as shown in dot-dash lines in FIG. 1.

As herein shown, the unit D is rigidly mounted in cantilever fashion at the legs 19 of the frame F (see FIGS. 1 and 4). This unit comprises a pair of flat rectangular graphite plates 32 and 33 which are supported in horizontal positions on four metal angles 132 and are spaced apart by four graphite bars 133 of square cross section which extend around the periphery of the unit D to seal the periphery of the narrow rectangular plenum chamber 35 formed within the unit D.

The graphite plates 32 and 33 are of the same size and shape and are provided with central openings having circular edge surfaces 36 with a diameter equal to or slightly greater than the external diameter of the crucible c, so that the crucible may be moved upwardly by the piston rod 12 through the unit D to the unloading position shown in FIG. 4.

An inert gas, such as helium, argon or nitrogen is continuously fed into opposite sides of the plenum chamber 35 through flexible hoses 77 from helium tanks or other source of gas so that the hollow graphite susceptor 16 and/or the crucible c is bathed in the inert gas and maintained under non-oxidizing conditions when in the elevated position shown in FIG. 4. This prevents oxidation of the hot graphite of the susceptor 16 at an excessively high rate and provides the graphite susceptor with a long useful life which may be 10 or 20 times that which would result if the unit D were omitted. This arrangement also facilitates cooling of the outer surface of the finished crucible c at the end of the cycle so that such surface is less likely to be deformed or damaged by the lifting tongs when it is raised off of the graphite susceptor at the end of the cycle. A suitable inlet connection 76 may be provided on the associated graphite bar 133 for each of the hoses 77.

While non-oxidizing conditions are needed in the furnace A and the unit D to avoid oxidation of the graphite, such oxidation is not a problem if the mandrel and the furnace plates are made of platinum instead of graphite.

Figure 5:
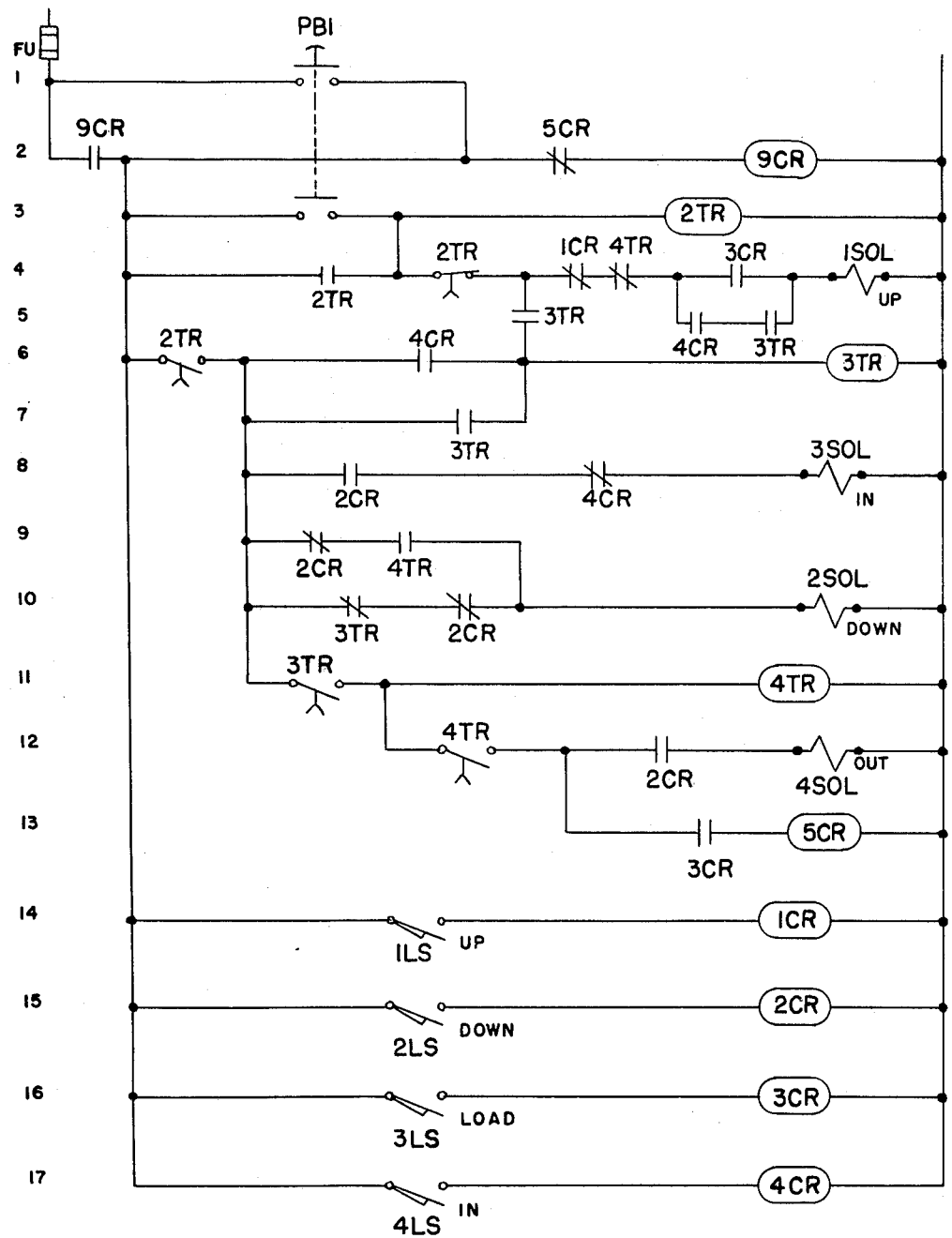
FIG. 5 is a schematic electrical diagram illustrating one form of automatic control system.

The movable cooling unit B shown herein is in the form of a truck or carriage and has its own rigid metal frame f comprising a number of metal angles welded or otherwise rigidly connected together. The frame f includes four vertical legs 38, which are connected at their upper ends to a pair of longitudinal horizontal angles 39, and a pair of lateral horizontal angles 40, the angles 39 and 40 forming a rectangular framework for supporting a flat rectangular plate or insulating board 41 in a horizontal position parallel to the rails 30 and the insulating boards 23 and 124 described above. The plate 41 preferably comprises transite board. The lower ends of the legs 38 are rigidly connected to a pair of longitudinal horizontal angles 42 and a pair of horizontal lateral edges 43. Four grooves wheels 44 are provided on the frame f with their horizontal shafts 45 mounted on the angles 42. Each wheel has a central groove 46 of a size to receive the rail 30, as shown in FIG. 2, so that the unit B is accurately located as it is guided by the rails 30 during its reciprocation. Fixed stops 66 and 67 may be provided on the rails 30 to limit the travel and assist in locating the cup 7 in alignment with the furnace opening and the circular openings 36 of the unit D. Movement of the unit B between said stops may be effected manually in response to a signal or automatically by means of a suitable motor, such as the motor M of FIG. 1, and a suitable electrical control as shown in FIG. 5.

The air cylinder 13 and piston rod 12 may be mounted on the unit B in any suitable manner. As herein shown, the piston rod 12 extends through a small circular hole 53 in the mounting plate 14 and through similar holes 47 and 48 in the board 41 and the refractory base 9, respectively. As herein shown, means are provided for adjustably mounting the plate 14 on the longitudinal angles 42 including the threaded bolts 15 and the adjusting nuts 49 and 50.

Figure 3:
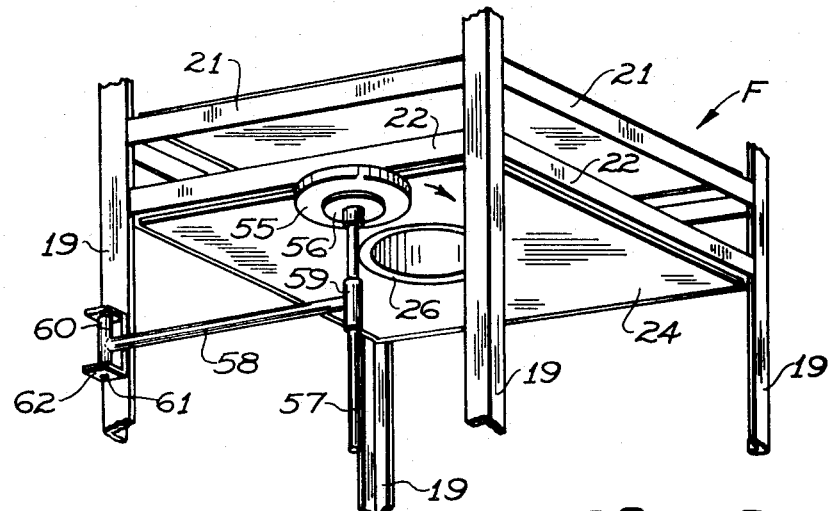
FIG. 3 is a fragmentary perspective view with parts omitted showing portions of the frame, the refractory cover plate being shown in its normal retracted position before it is swung in the direction of the arrow to cover the circular furnace opening.

As shown in FIGS. 1 and 3, the refractory cover plate 55 is rigidly mounted on a circular metal hub 56 located on the upper end of a vertical support rod 57. Swinging means are provided for supporting the rod 57 including a horizontal supporting arm 58 having integral vertical sleeves 59 and 60 at its opposite ends. The rod 57 fits snugly in the sleeve 59 and may be adjustably supported in any desired position. A vertical pivot pin 61 extends through the sleeve 60 and into the flanges of a U-shaped mounted bracket 62, which is rigidly mounted on one of the vertical legs 19. The pivot pin supports the arm 58 in a horizontal position and permits it to be swung from a normal retracted position, as shown in solid lines in FIGS. 1 and 3, to a closed position wherein the rod 57 is coaxial with the furnace body 1 and the cover plate 55 covers the bottom circular opening 26 of the board 24. The diameter of said cover plate is preferably equal to or greater than the internal diameter of the hole 26 and is so mounted that it will substantially close the bottom opening of the furnace chamber 37 when swung to said closed position.

It will be noted that the bottom surface of the board 24 is horizontal and below the angles 22 so that only the legs 19 obstruct movement parallel to that surface. Therefore, the flat upper surface of the cover plate 55 may be located at or spaced a very short distance below the lower surface of the board 24 and may be swung in that plane. Likewise, the upper surface of the refractory cup 7 or any horizontal extension thereof may be located at or very near the board 24 without interfering with the reciprocating movement of the unit B.

When carrying out the process of the present invention at atmospheric pressure, it is preferable to fill the furnace chamber 37 with helium and to maintain the helium atmosphere during the heating step. When employing helium in this manner, it is preferable to maintain a flow of helium into the furnace chamber at a slow rate sufficient to maintain the desired inert atmosphere and insufficient to interfere with proper heating of the furnace chamber.

As herein shown, an externally cylindrical block 70 formed of metal or a refractory material is rigidly mounted on top of the refractory cover 5. The block has a central vertical passage 151, which is aligned with the central vertical passage 51 of the cover 5 and the central hole 54 of the graphite plate 63 and has an inclined radial passage 72 extending from an inlet 73 to the passage 151. A quartz lens or slight glass 71 is mounted in a recess at the top of the passage 51 to permit viewing of the furnace chamber and use of a conventional optical pryometer to measure the furnace temperature.

A flexible supply hose 74 is connected to the inlet 73 to supply helium to the furnace through the passages 72 and 51. Such hose is connected to a suitable constant pressure source of helium, such as one or more helium tanks having a constant pressure valve. The hoses 77 of the unit D may be connected to the same source.

It will be understood that the apparatus shown herein for purposes of illustration may be modified or improved in many ways and that various other means can be employed in the practice of this invention. Conventional temperature controls may, for example, be employed to maintain the desired temperature in the furnace in response to the temperature of the crucible or the furnace. Such controls may incorporate a pyrometer, such as a radiation or optical pyrometer, or other suitable means to measure the furnace temperature and/or the glass temperature.

FIG. 5 is a schematic electrical diagram illustrating one type of electrical control system which may be used to carry out the process of the present invention. The graphite symbols and basic device designations therein are generally in accordance with the electrical standards of the Joint Industrial Council as set forth for example in the April and May, 1967 issues of "Electro-Technology". The lines of the control circuit are numbered 1 through 17 at the left of FIG. 5 and are referred to by these numbers in the description below.

In the electrical system illustrated there are four solenoids identified as 1 SOL through 4 SOL. The solenoid 1 SOL controls the supply of air to the double-acting pneumatic cylinder 13 and, when energized, causes the piston rod 12 to move upwardly and raise the graphite mandrel 16. The solenoid 2 SOL controls the supply of air to the opposite end of the pneumatic cylinder 13 and, when energized, causes the piston rod to move downwardly to lower the mandrel 16.

It will be apparent that various types of pneumatic cylinders, air motors or electric motors may be employed to effect reciprocation of the mandrel 16. The same is true in connection with reciprocation of the carriage at B. A motor M is shown schematically in FIG. 1 to represent a conventional means for reciprocating the carriage. Such motor may, for example, be a double-acting pneumatic cylinder similar to cylinder 13 or a reversible electric motor for effecting rotation of the wheels 44 to move the carriage from one stop 66 to the other stop 67.

The solenoid 3 SOL controls the motor M (FIG. 1) and, when energized, causes the carriage B to move horizontally in a direction from the loading position to the operating position below the furnace A and against the stop 66. The solenoid 4 SOL also controls the motor M and, when energized, moves the carriage back toward the loading position below the unit D and against the stop 67. When the motor M is omitted, the solenoids 3 SOL and 4 SOL may be employed to operate a horn or ready light and thereby signal the operator that it is time to move the carriage so that the process may be carried out in the same manner.

The electrical system includes four normally-open limit switches 1LS through 4LS may be located in various positions to function in the desired manner. The limit switch 1LS closes in response to movement of the mandrel 16 to its uppermost position, for example, in response to movement of the piston to the top of cylinder 13 (see FIG. 2). The switch 2LS closes in response to movement of the mandrel 16 to its lowermost position wherein the plate 11 is in engagement with the bottom of the cup 7. As herein shown, the limit switch 2LS has an actuator 68 which engages the bottom of the plate 11.

The limit switch 3LS closes in response to movement of the cooling unit B to the loading position shown in FIG. 4, wherein the carriage engages the stop 67. As shown in FIG. 4, the projection 65 on the carriage at 39 engages the actuator 75 of the switch 3LS. The switch 4LS closes in response to movement of the ooling unit to the operating position below the furnace as shown in FIGS. 1 and 2, wherein the carriage engages the stop 66. When the cooling unit arrives at that position, it engages the actuator 64 of the switch 4LS to close the switch.

In the operation of the machine the cycle begins with the cooling unit B in the loading position of FIG. 4 and the mandrel 16 in the lowermost position. The operator starts the cycle by depressing the pushbutton PB1 to close the circuit in lines 1 and 3. This energizes the main control relay 9CR, which is maintained energized by closing of its contacts in line 2, and also energizes the timer relay 2TR, which is maintained energized by closing of its contacts in line 4. The closing of the main relay contacts in line 2 results in energizing of the control relay 3CR, assuming that the cooling unit B is in its expected loading position to close the limit switch 3LS. The normally-open 3CR contacts close in line 4 to energize the solenoid 1 SOL and thereby raise the mandrel 16. When the mandrel reaches its uppermost position, the limit switch 1LS closes to energize the relay 1CR and the normally closed 1CR contacts in line 4 open to deenergize the solenoid 1 SOL.

The timer 2TR provides the operator with a predetermined time delay to place the slip-cast crucible c on the mandrel 16 as shown in FIG. 4. At the end of this time delay the normally-closed 2TR contacts open in line 4 and the normally-open 2TR contacts close in line 6 to energize the timer relay 3TR, which is maintained energized by closing of its contacts in line 7, and to energize the solenoid 2 SOL in line 10 and lower the mandrel 16 to its lowermost position. When it arrives at that position, the limit switch 2LS closes to energize the relay 2CR and open the normally-closed 2CR contacts in line 10, thereby deenergizing the solenoid 2 SOL. At the same time the normally-open 2CR contacts in line 8 close to energize the solenoid 3 SOL and cause the cooling unit B to move from the loading position of FIG. 4 to the operating position of FIG. 2. When the unit arrives at the operating position, the limit switch 4LS closes to energize the relay 4CR and to open the 4CR contacts in line 8, thereby deenergizing the solenoid 3 SOL. At the same time the normally-open 4CR contacts in line 5 close to energize the solenoid 1 SOL and raise the mandrel, the normally-open 3TR contacts at lines 5 and 7 being closed at this time. When the mandrel arrives at its uppermost position in the furnace, as shown in FIG. 2, the limit switch 1LS closes to energize the control relay 1CR and open its normally-closed contacts in line 4, thereby deenergizing the solenoid 1 SOL.

The heating time in the furnace is controlled by the timer relay 3TR so that the crucible is heated to a temperature within the desired range (e.g., 3000° to 3100°F. in one embodiment) for a predetermined period of time, such as 1 to 3 minutes. At the end of this time the normally-open 3TR contacts in line 11 close to energize the timer relay 4TR, whose normally-open contacts in line 9 close immediately to energize the solenoid 2 SOL. This lowers the mandrel to its lowermost position in the cooling unit B, whereupon the limit switch 2LS closes to energize the relay 2CR, open the normally-closed 2CR contacts in line 9 and close the normally-open 2CR contacts in line 12.

The timer relay 4TR provides a predetermined time delay, such as one-half minute or so, to allow the mandrel 16 and the crucible c to cool down to a temperature, such as 2700°F., at which the glass of the crucible is sufficiently firm to permit gripping. This temperature is preferably about 2700°F. but may be a few hundred degrees lower than this. A lower temperature such as 2400°F, is undesirable in that it increases the time for each cycle and thereby favors the formation of cristobalite. The timer 3TR is, therefore, adjusted to complete the cycle before the crucible cools to such a low temperature (for example, to provide a time delay of 20 to 40 seconds).

At the end of the preselected cooling period, the relay 4TR closes its contacts in line 12 to energize the solenoid 4 SOL and thereby causes movement of the cooling unit B to the loading position below the unit D. When it arrives at that position (see FIG. 4), the limit switch 3LS closes to energize the relay 3CR and closes its contacts in line 13, thereby energizing the relay 5CR. The normally-closed 5CR contacts the open momentarily in line 2 to deenergize the main control relay 9CR and terminate the cycle. The operator must, therefore, depress the pushbutton PB1 to start another cycle to raise the mandrel to the uppermost position shown in FIG. 4. After the mandrel is in such position, he may remove the finished mandrel with conventional tongs and place another slip-cast crucible on the mandrel within the time permitted by the timer 2TR.

The cycle may be repeated rapidly to effect mass production of crucibles at a relatively high rate, such as 15 to 20 per hour, depending on the size of the crucibles and the temperatures employed.

It will be manifest that the electrical system may be made fully automatic so that the pushbutton PB1 need not be depressed at the beginning of each cycle. However, when the apparatus is loaded and unloaded manually, a pushbutton of this type is usually preferred.

In the event the cooling of the sintered crucible is to be effected when the cooling unit B is in the loading position (FIG. 4), the electrical system can be modified so that the timer 3TR provides the desired cooling period in that position before the cycle is completed or before the piston 12 is actuated to raise the finished glass crucible out of the cup 7, for example to provide a cooling period of 20 to 40 seconds in the position of FIG. 4 before the cover door (if any) is opened and before a visible or audible signal is given to indicate that the cycle has been completed.

The simple furnace shown herein is adequate for most crucibles commonly used at the present time and capable of heating the crucible to a temperature in the range of 2950° to 3150°F. for the desired sintering period. However, more uniform heating is desired for extremely large crucibles so that the heating time will depend less on the axial length of the crucible and more on the wall thickness. Generally the optimum heating times and temperatures increase as the wall thickness increases. However, relatively short heating time can be employed even when the wall thickness is as high as 0.4 inch. The wall thickness of the crucible is usually no more than 0.3 inch even for large crucibles and is preferably no more than 0.2 inch.

It will be apparent that the refractory cover plate 55 may be moved by a pneumatic cylinder or by the carriage B rather than by hand and that the electrical control system may include means to effect automatic opening and closing of the furnace opening by such plate, if this is desired. Such cover plate can be omitted and replaced by a horizontal plate extension at the top of cup 7 which keeps the furnace opening closed at all times.

It will be understood that the type of electrical system used to carry out the process of this invention may be of various types. No particular advantage is claimed for the type illustrated herein over other types which can be used. For example, the system could employ equipment of the general type shown in U.S. Pat. No. 3,356,130 (Mellen et al.) and could employ conventional timing means and temperature control means of various types. An automatic control system of the general type disclosed could also be employed when sintering in a vacuum instead of a helium temperature but extra equipment would be needed to help maintain the low pressure in the furnace.

The embodiment of the invention shown in the drawings is for purposes of illustration only and can be modified and improved in various ways. For example, the swinging horizontally moving cover plate 55 can be replaced by a larger horizontal cover plate extending rearwardly from the top of cup 7 and moving horizontally in unison with carriage B.

In the embodiment shown, the finished glazed crucible is cooled in unit B in a position directly below the hot furnace. The crucible can be cooled more easily when the cooling unit B is moved away from the furnace to the position shown in FIG. 4. In such case the inert gas provided at the circular opening 36 should be provided throughout the cooling period or else the opening 36 should be closed manually or automatically by a suitable plate or door to prevent air from entering cup 7. Note that no door or cover plate is needed to close the top opening of cup 7 of the cooling unit in the embodiment shown in the drawings because the furnace itself serves as a cover to exclude air from the cooling chamber of said cup during cooling of the sintered article.

In carrying out the process of this invention, it is preferable to employ molded or slip-cast crucibles consisting essentially of fused silica — that is, fused silica having a purity of at least 99.95 percent. A fused silica of the desired particle size may be obtained by milling, grinding or otherwise pulverizing fused quartz of high purity.

For example, fused quartz sand having a high purity, such as 99.97 to 99.99 percent, may be ground in a special ball mill without introducing significant contamination. Such ball mill may be a conventional ball mill having 1.5-inch diameter balls formed of pure fused quartz and a conventional rubber lining formed of a low-ash rubber such as a polyurethane rubber or other organic material which will not cause significant permanent contamination. The example which follows is intended to illustrate the practice of the invention without limiting its scope.

Fused quartz sand with a purity of at least 99.97 percent is placed in the special ball mill described above together with distilled water and ground to minute size (−325 mesh) to produce a conventional slurry suitable for subsequent slip casting. The average particle size is about 2 to 4 microns. About four parts by weight of the fused quartz sand are employed for each part of water in each batch. A substantial number of batches are produced in this way, each having a weight of around 200 pounds.

Slip casting may, thereafter, be carried out using a porous mold, such as a graphite or silica mold or a graphite-lined or silica-lined plaster mold, having an internal surface with a shape corresponding to that of the external surface of the desired crucible (for example, the crucible of FIGS. 1 and 2). Before the slurry produced in the manner described in the previous paragraph is poured into the plaster mold, the internal surface is wetted with water and coated with pure powdered graphite of small particle size, such as 10 to 50 microns. The dry graphite powder is rubbed on the wet surface of the mold to provide a continuous shiny black coating, and any excess graphite is then wiped off.

The slurry is then poured into the mold and, after a suitable period, such as 10 to 15 minutes, sufficient to obtain a wall thickness of about 0.1 inch, the mold is turned upside down to drain off the excess slurry and returned to the upright position. After drying for 30 minutes or so at 110°F. Such crucible may, for example, have a wall thickness of 0.1 inch, an axial length of 5 inches and an external diameter of 5 inches.

The partially dried crucible is then placed in a heating chamber having a temperature of about 350°F. for a period of time at least sufficient to effect thorough drying (e.g., 1 to 4 hours) and the temperature of the air in the heating chamber is then raised slowly to a sintering temperature of 2100°F. to eliminate combustibles, to eliminate any absorbed water not previously removed, and to increase the strength of the crucible. After a sintering period, such as 1 to 2 hours, sufficient to provide strength for handling, the crucible is rapidly cooled with air to room temperature.

Dried slip-cast crucibles formed in this manner are then treated in equipment of the type shown in FIGS. 1 to 4 by placing each crucible on the graphite mandrel 16 when it is in the position shown in FIG. 4 and has a temperature of about 2700°F. The crucible is automatically fed to the furnace chamber on the mandrel and heated in the helium atmosphere for a suitable period of time, such as 3 to 4 minutes, to a temperature of about 3050°F. until the crucible is transparent. At the end of such period, the crucible is automatically lowered to the position shown in FIG. 1 and allowed to cool in the helium atmosphere for around one-half minute to a temperature of about 2700°F. The crucible is then moved to the unloading position shown in FIG. 4 and removed manually by tongs or the like. It may be cooled rapidly to room temperature without breakage by placing it in water, but such rapid cooling it not necessary. The amount of cristobalite present is substantially less than one percent and obviously insignificant as evidenced by the transparency of the glass.

In carrying out the process described above, the sleeve 6, the plate 63, and other parts of the furnace may have a surface temperature of 3100° to 3200°F. or somewhat higher. The glass of the crucible is heated to 3050°F. in the above example. While a higher maximum glass temperature, such as 3150° or 3200°F. can be used, it is often preferable to avoid the higher temperatures, for example, because of the tendency to produce surface blistering. High temperatures also hasten oxidation of the graphite parts and reaction of the silica with graphite to form carbon monoxide gas. Silicon monoxide gas is also formed due to reaction of graphite with silicon dioxide. The process of this invention is carried out in such a way as to minimize the damage done by trapped gases during sintering and to cause such trapped gases to move radially outwardly and thus not damage the internal surface of the crucible. This is important whether or not the mandrel 16 is slotted or perforated.

The transparent glass crucible of the above example is materially improved if the initial sintering at 2100°F. is carried on in a vacuum furnace at a suitable low pressure, such as 10 torrs or less, to remove essentially all of the water so that the glass of the finished transparent crucible has an infrared absorption beta OH factor below 0.01 at a wavelength of 3.5 microns. Such glass has a much greater resistance to devitrification than a glass which would be produced by the procedure of the above example if firing were at atmospheric pressure.

The special vacuum drying procedure makes it easier to form high quality transparent glass without excessive surface blistering or trapping of gas and easier to obtain transparency and optical quality with lower temperatures or lower heating times.

If vacuum drying is not used, it may be desirable to sinter the glass longer and/or to heat above the melting point of cristobalite or above 3200°F. Whether or not vacuum drying is employed, the present invention contemplates various optional alternate procedures.

In the practice of the present invention it will be understood that any fused silica can be used if it has the required high purity. As used in the present application, the broad term "fused silica" covers various forms of vitreous silica including synthetic vitreous silica (for example, produced from silica resulting from conversion of a silicon compound), fused quartz produced from clear crystalline quartz, and vitreous silica produced from sand. The latter may be transparent, translucent or opaque. The process of this invention may, for example, be employed to treat a crucible formed on a platinum or graphite mandrel by conversion of a silicon compound such as silicon chloride vapor.

The process of the present invention is well suited to the production or precision transparent quartz glass of very high quality in many different sizes and shapes, and it will be understood that many different methods may be employed to mold or form the article including slip casting, isostatic pressing, injection molding, hot pressing and the like, and that the shaping surface of the mold may be formed of or coated with many different materials which minimize contamination of the final product including carbon, graphite or high-purity combustible organic materials, such as polyurethane or Teflon, which can be eliminated by firing of the molded article, or silicon metal or silicon-containing compounds which are not objectionable in the final product, such as silicon carbide, silicon nitride ($Si_3H_4$) or silica ($SiO_2$).

For example, when the article is one which can be shaped by pressing at 10,000 to 50,000 pounds per square inch, the steel shaping surfaces can be coated with high-purity carbon, graphite, polyurethane or Teflon or with a high-purity material selected from the group consisting of silicon metal, silicon carbide, silicon nitride, silica and mixtures thereof. The shaping surface is preferably formed to the desired shape with close tolerances and with a very smooth surface preferably having pores no greater than 10 microns in diameter. The smooth shaping surface is particularly important when making transparent quartz glass products because a rough surface on the finished article reduces transparency by interfering with light transmission and makes the glass look impure.

It will be understood that, unless the context shows otherwise, the term "transparent", as used in the specification and claims in connection with the glass resulting from the process of this invention, refers to the glass itself regardless of the smoothness of the surface. It will also be understood that high quality molds can produce the desired surface so that the article itself as removed from the induction furnace is fully transparent without subsquent polishing.

While the process of this invention is particularly well suited to production of thin-walled articles, such as crucibles, evaporating dishes and glass tubing, it is also advantageous for the manufacture of large bell jars, and various other molded or slip-cast articles. The process may be used for the manufacture of beakers, flasks, heat shields, tapered joints, acid tanks, reactor vessels and various other articles, particularly quartz glass articles used in the chemical industry or the semiconductor industry.

Crucibles made according to the process of this invention contain substantially less than one percent cristobalite and usually have a thermal shock resistance such that they will not crack when plunged in water at 70°F. while at a temperature of 2000°F. This applies to the transparent or full density products and also to those with a density which is 99 percent of full density.

The size of the crucibles may vary considerably. Usually the crucibles have a wall thickness of about 0.08 to 0.15 inch, a diameter of 4 to 8 inches and an axial length of 4 to 8 inches. However, this invention makes it feasible to produce larger crucibles, for example, with somewhat thinner walls, diameters of 10 inches or so, and axial lengths of 10 inches or so.

It will be understood that, in accordance with the provisions of the patent laws, variations and modifications of the specific methods an devices disclosed herein may be made without departing from the spirit of the invention.

Having disclosed our invention, we claim:

1. Apparatus for mass production sintering of precision transparent cup-shaped vitreous silica receptacles comprising an induction furnace having refractory walls enclosing a heating chamber, an opening at the bottom of said chamber, and retractable cover means for closing said bottom opening to exclude air from said heating chamber, induction heating means surrounding said heating chamber for heating each silica receptacle placed in said chamber to a sintering temperature of from about 2950° to about 3150°F., a graphite susceptor comprising a hollow mandrel having an external surface of a predetermined generally symmetrical shape complementary to the inner surface of the cup-shaped silica receptacle to fit and support the inner surface of the receptacle in an upside-down position, a movable carriage, means for guiding said carriage between a loading position spaced from the furnace and an operating position below the bottom opening of said furnace, means for moving the carriage from said loading position to said operating position and for returning the carriage to said loading position before the end of each cycle, a cooling unit mounted on said carriage and having refractory walls defining a cooling chamber which receives said graphite susceptor, said cooling unit having an opening at the top which aligns with the bottom opening of said furnace when the carriage is in said operative position to permit vertical movement of said graphite susceptor relative to said furnace between said heating chamber and said cooling chamber, cooling means surrounding said cooling chamber for receiving a circulating cooling fluid to effect cooling of each sintered silica receptacle to a temperature of from about 2500° to about 2700°F. during each cycle within one minute after completion of the sintering operation in said furnace, motor means for causing relative vertical movement between said graphite susceptor and said furnace between a first position wherein the susceptor is in said cooling chamber and a second position wherein the susceptor is above said cooling unit, said motor means causing relative movement of said susceptor through said openings into said heating chamber when the carriage is in said operating position, closure means at said furnace opening for restricting flow of air to said heating chamber during sintering of each receptacle and for restricting flow of air to said cooling chamber during cooling of the sintered receptacle to maintain non-oxidizing conditions in said chambers, means for feeding helium to said heating chamber to maintain a helium atmosphere therein during sintering and to remove air from said heating chamber, and electric control means to control said motor means during each cycle and to provide each silica receptacle with a predetermined sintering period in said heating chamber and a predetermined cooling period in said cooling chamber, said control means including timer means for determining said sintering period, and means responsive to said timer means for causing said motor means to effect relative vertical movement between said furnace and said graphite susceptor and to place said graphite susceptor in said cooling chamber within about 1 to about 6 minutes after said susceptor is placed in said heating chamber.

2. Apparatus as defined in claim 1 wherein said control means includes second timer means for determining said cooling period during each cycle, said second timer means being operable within one minute after the sintered receptacle is moved from the heating chamber into said cooling unit, whereby a predetermined cooling period may be provided during each cycle and the cycle may be repeated at regular intervals with substantially the same heating and cooling conditions.

3. Apparatus as defined in claim 2 wherein cooling of the sintered receptacle is effected while the carriage is in said operating position, and motor means are provided for moving said carriage from said operating position to said loading position in response to operation of said second timer means.

4. Apparatus as defined in claim 1 wherein said graphite susceptor is mounted on a refractory support plate which closes said furnace opening when said susceptor is in its uppermost position in said heating chamber, said support plate is mounted to move vertically on said carriage, and means are provided for, moving said cover means to a closed position at said furnace opening when said carriage is moved toward said loading position.

5. Apparatus as defined in claim 1 wherein said first timer means causes said motor means to lower said graphite susceptor about 2 to about 4 minutes after it is raised into said heating chamber and said induction heating means causes each receptacle to be heated from a temperature below 2200°F. to a temperature of at least 3000°F. in less than 1 minute.

6. Apparatus as defined in claim 1 wherein means are provided for causing said graphite receptacle to be raised out of the cooling unit when the carriage is in said loading position and means are provided for causing said carriage to be advanced from said loading position to said operating position in response to lowering of the graphite susceptor into said cooling chamber at the beginning of the cycle.

7. Apparatus for mass production sintering of precision transparent cup-shaped vitreous silica receptacles comprising an induction furnace having refractory walls enclosing a heating chamber, an opening of the bottom of said chamber, and cover means for closing said bottom opening to exclude air from said heating chamber, induction heating means surrounding said heating chamber for heating each silica receptacle placed in said chamber to a sintering temperature of from about 2950° to 3150°F., a graphite susceptor comprising a hollow mandrel having an external surface of a predetermined generally symmetrical shape complementary to the inner surface of the cup-shaped silica receptacle to fit and support the inner surface of the receptacle in an upside-down position, a movable carriage, means for guiding said carriage between a loading position spaced from the furnace and an operating position below the bottom opening of said furnace, means for moving the carriage from said loading position to said operating position before the end of each cycle, a cooling unit having refractory walls defining a cooling chamber which receives said graphite susceptor, cooling means surrounding said cooling chamber for receiving a circulating cooling fluid to effect cooling of each sintered silica receptacle to a temperature of from about 2500° to about 2700°F. during each cycle within one minute after completion of the sintering operation in said furnace, said cooling unit having an entrance opening to permit movement of the graphite susceptor from said furnace into said cooling chamber, motor means for causing movement of said graphite susceptor relative to said furnace and said cooling unit, said motor means causing relative vertical movement of said graphite susceptor relative to said furnace to move the susceptor through said bottom opening into said heating chamber when the carriage is in said operating position and causing movement of said susceptor relative to said cooling unit to move said susceptor through said entrance opening into said cooling chamber after sintering of the silica receptacle in said furnace has been completed, means for restricting flow of air through said bottom opening to said heating chamber during sintering of each receptacle and for restricting flow of air through said entrance opening to said cooling chamber during cooling of said receptacle to assist in maintaining non-oxidizing conditions in said heating and cooling chambers, means for feeding helium to said heating chamber to maintain a helium atmosphere therein during sintering and to remove air from said heating chamber, and electric control means to control said motor means during each cycle and to provide each silica receptacle with a predetermined cooling period in said cooling chamber, said control means including timer means for determining said sintering period, and means responsive to said timer means for causing said motor means to effect relative vertical movement between said graphite susceptor and said furnace to remove said susceptor from said heating chamber within about 1 to about 6 minutes after the susceptor is placed in said heating chamber.

8. Apparatus as defined in claim 7 wherein said control means includes second timer means for determining said cooling period during each cycle, said second timer means is operable within one minute after the hot sintered receptacle is moved into said cooling unit, and means are provided for moving said graphite susceptor to a position for unloading of the sintered receptacle in response to operation of said second timer means.

\* \* \* \* \*

UNITED STATES PATENT AND TRADEMARK OFFICE
CERTIFICATE OF CORRECTION

PATENT NO. : 3,972,704
DATED : August 3, 1976
INVENTOR(S) : Ted A. Loxley et al.

It is certified that error appears in the above-identified patent and that said Letters Patent are hereby corrected as shown below:

```
Column 4, line 34, "of" should appear before "fused".
Column 4, line 59, "as" should be --or--.

Column 7, line 63, "sintering" should read --sintered--.
Column 9, line 59, "shon in FIG. 7" should read --shown in
         FIG. 1.
Column 10, line 4, "above" should read --shown--.
Column 10, line 60, "curcible" should read --crucible--.
Column 14, line 8, "graphite" should read --graphic--.
Column 14, line 49, "which" should appear before "may".

Column 17, line 8, "temperature" should be --atmosphere--.
Column 17, line 27, "of" should read --or--.
Column 19, line 43, "(Si3H4)" should read --(Si3N4)--.
Column 21, line 57, "receptacle" should read --susceptor--.
```

Signed and Sealed this

Twenty-eighth Day of December 1976

[SEAL]

Attest:

RUTH C. MASON
*Attesting Officer*

C. MARSHALL DANN
*Commissioner of Patents and Trademarks*